(12) United States Patent  (10) Patent No.: US 7,806,070 B2
Williams  (45) Date of Patent: Oct. 5, 2010

(54) METHOD AND APPARATUS FOR A VEHICLE FORWARD DIRECTION SIGNAL

(76) Inventor: George Lamont Williams, 3100 Highland Ter. West, Austin, TX (US) 78731

( * ) Notice: Subject to any disclaimer, the term of this patent is extended or adjusted under 35 U.S.C. 154(b) by 93 days.

(21) Appl. No.: 12/127,344

(22) Filed: May 27, 2008

(65) Prior Publication Data

US 2008/0282966 A1  Nov. 20, 2008

Related U.S. Application Data

(63) Continuation-in-part of application No. 10/963,121, filed on Oct. 12, 2004, now abandoned, which is a continuation-in-part of application No. 10/620,848, filed on Jul. 16, 2003, now abandoned, which is a continuation-in-part of application No. 10/176,996, filed on Jun. 21, 2002, now abandoned.

(60) Provisional application No. 60/299,872, filed on Jun. 21, 2001.

(51) Int. Cl.
*B60Q 1/38* (2006.01)
*B60Q 9/00* (2006.01)
(52) U.S. Cl. .................................. 116/36; 116/35 R
(58) Field of Classification Search ............ 116/36, 116/42, 56, 28 R, 35 R; 340/463, 464, 468, 340/475, 479, 725.5, 431, 433, 470, 425.5
See application file for complete search history.

(56) References Cited

U.S. PATENT DOCUMENTS

| 2,252,339 | A | * | 8/1941 | Baker | 362/231 |
|---|---|---|---|---|---|
| 3,109,158 | A | * | 10/1963 | Coombs | 340/464 |
| 3,273,117 | A | * | 9/1966 | Martauz | 340/475 |
| 3,364,384 | A | * | 1/1968 | Dankert | 315/79 |
| 3,518,624 | A | * | 6/1970 | Smith, Jr. | 340/475 |
| 3,691,525 | A | * | 9/1972 | McClellan et al. | 340/466 |
| 3,784,974 | A | * | 1/1974 | Hamashige | 340/464 |
| 4,808,968 | A | * | 2/1989 | Caine | 340/479 |
| 5,258,740 | A | * | 11/1993 | Viano et al. | 340/467 |
| 5,353,008 | A | * | 10/1994 | Eikenberry et al. | 340/479 |
| 5,477,209 | A | * | 12/1995 | Benson et al. | 340/479 |
| 5,680,101 | A | * | 10/1997 | Pitcher | 340/479 |
| 5,736,925 | A | * | 4/1998 | Knauff et al. | 340/468 |

(Continued)

FOREIGN PATENT DOCUMENTS

EP  453601 A1 * 10/1991

*Primary Examiner*—R. A. Smith
(74) *Attorney, Agent, or Firm*—Rick B. Yeager

(57) ABSTRACT

A vehicle direction indicator system is designed to alert surrounding drivers of the intentions of the vehicle operator to continue in a forward direction. The indicator system has a plurality of indicator light end points and each end point is powered by the vehicle's electrical system and includes a housing, a light source holder and a lens attached to the front portion of the housing, and a vibration feedback element to indicate to the driver when the signal is activated. The end points may be positioned in various locations such as the grill, spoiler, side markers and the like and may simultaneously emit a color when the vehicle driver actuates the indicator system within the vehicle. The system is preferably mounted onto the front portion of the vehicle and is capable of signaling to other drivers at a four way intersection an intention to continue in a straight direction.

20 Claims, 10 Drawing Sheets

U.S. PATENT DOCUMENTS

| | | | |
|---|---|---|---|
| 6,744,370 B1 * | 6/2004 | Sleichter et al. | 340/576 |
| 7,187,274 B2 * | 3/2007 | Clark | 340/457 |
| 7,327,234 B2 * | 2/2008 | Egami et al. | 340/429 |
| 2005/0017861 A1 * | 1/2005 | Hunter | 340/457 |
| 2006/0044130 A1 * | 3/2006 | Danowski | 340/475 |

* cited by examiner

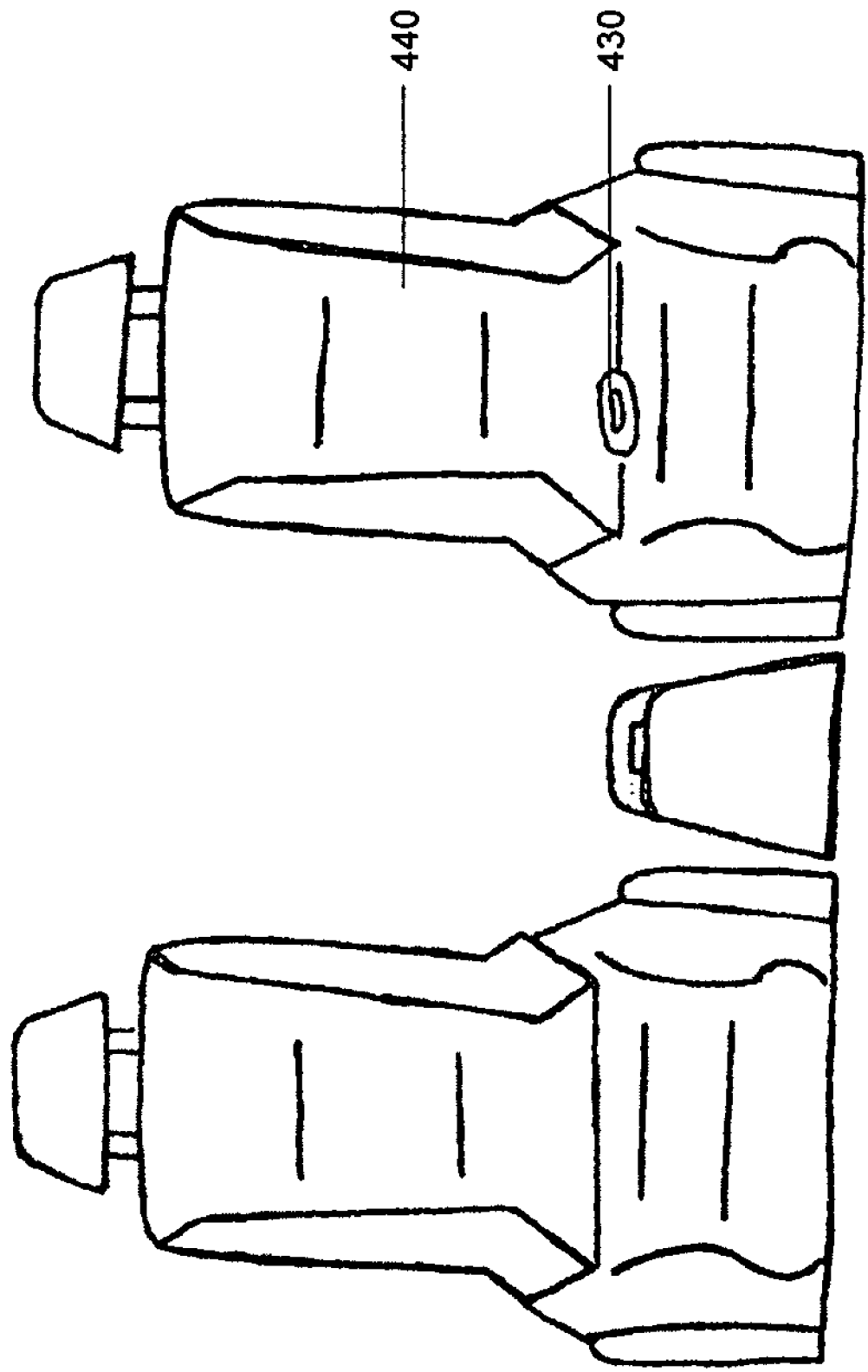

METHOD AND APPARATUS FOR A VEHICLE FORWARD DIRECTION SIGNAL

RELATED APPLICATIONS

This is a continuation-in-part application to application Ser. No. 10/963,121 which was filed Oct. 12, 2004 now abandoned, which was is a continuation-in-part application to application Ser. No. 10/620,848 which was filed Jul. 16, 2003 now abandoned, as a continuation-in-part application to Ser. No. 10/176,996 filed on Jun. 21, 2002 now abandoned, relating back to a provisional patent application having the Ser. No. 60/299,872 filed on Jun. 21, 2001 and incorporated in its entirety.

TECHNICAL FIELD

The present invention relates generally to a system and method for a forward signaling device, namely to a vehicle direction signaling device to indicate a vehicle proceeding in a straightforward direction.

BACKGROUND OF THE INVENTION

Signaling devices designed for motor vehicles are well known in the art. Since the earliest days of the automobile and other motorized vehicles, various indicator lights were added to the outside surface of the vehicle, activated by the driver, to warn other drivers of his or her intentions. Brake lights, turn signals, reverse lights and hazard warning flashes are conventional examples of such indication devices. These indicators are generally powered by a vehicle's electrical system, and the brake lights are red in color, the turn signals and hazard signals are amber in color and the reverse lights are typically white in color.

There is, however, a driving condition that can cause confusion to other drivers and that does not currently have an indicator to give notice of the condition. The condition normally occurs when a driver arrives at a four way intersection along with one or more drivers that approach the same direction. A conscientious driver will use his or her turn signal to indicate a turn, however, a less conscientious driver may neglect to do so. Although the drivers need to signal their intentions to one another, there is no adequate signal for proceeding in a straight forward direction. In the spirit of driving defensively, it would be advantageous for a driver to have an additional indicator that would signal to other drivers that the driver intends to proceed in a straight ahead direction.

In the past decade, a number of advancements have occurred in the automobile industry. An example of such an advancement is seen in U.S. Pat. No. 5,731,755 (hereinafter the '755 patent) issued to Boxer on Mar. 24, 1998. The '755 patent discloses an indicator for designating a U-turn attempt having a series of sequentially illuminated lights forming the shape of the letter U. The U-turn indicator is activated by an actuator and a control module responds to the actuator and generates a control signal, thereby sequentially illuminating the series of lights. However, the '755 patent only provides for a U-turn indicator and fails to address a directional signal used when a driver is proceeding in a straight ahead direction.

Another advancement is depicted in U.S. Pat. No. 5,845,990 (hereinafter the '990 patent) issued to Hymer on Dec. 8, 1998. The '990 patent is a device for an automotive vehicle used during signal braking, deceleration, turning of the vehicle or an emergency situation. The device has two bodies facing rearwardly, mounted near the top of the back or the highest point of the vehicle adjacent the sides of the vehicle. Each body has a base and a cover with translucent lenses. Here, the light sources and reflectors are disposed on the base for illuminating the lenses to create the signaling as required. The device lights one or more lenses in the cover indicate braking while lighting an arrow shaped lens in the cover and a side lens facing out from the vehicle indicate intended turning. Although the '990 patent indicates when a driver intends to brake or make a left turn or right turn, it expressly fails to provide for a signaling device designed to indicate when a driver is proceeding in a straight forward direction.

Another advancement was the incorporation of a vehicle signal light assembly that conveys a plurality of messages to pedestrians and/or occupants of other vehicles as described in U.S. Pat. No. 6,515,583 (hereinafter the '583 patent). The '583 patent discloses a vehicle signal light assembly having a housing base which supports at least two circuit boards and a transparent or translucent cover to protect the circuit boards. Each circuit board carries light emitting diodes (LEDs) arranged to convey at least one message. In particular, the assembly can convey a word or symbol message in a horizontal orientation while the assembly is easily adapted for installation in a variety of orientations including right hand and left hand orientations. However, the '583 patent fails to claim and teach a vehicle signal device alerting surrounding vehicles of the driver's intention of proceeding in a straight forward direction.

U.S. Pat. No. 3,518,624 issued to Smith on Jun. 30, 1970, describes a combination signal light which is mounted on the roof of a vehicle. There is a need for a less obtrusive signal system which can be observed from a variety of positions relative to the vehicle.

There is a need for a distinct indicator to a driver that a straight ahead signal is activated.

In view of the above described deficiencies associated with the use of conventional vehicle indicator signal devices, the present invention has been developed to alleviate these drawbacks and provide further benefits to a user. The present invention and its benefits are described in greater detail herein below with respect to several alternative embodiments of the present invention.

SUMMARY OF THE INVENTION

The present invention in its several disclosed embodiments alleviates the drawbacks described above with respect to vehicle signaling devices and incorporates several additionally beneficial features. The present invention described herein is a method, system, and apparatus for vehicle signal to allow nearby motorists to know that the vehicle is about to continue in a straight ahead direction. Here, the present invention comprises an indicator system having at least two indicator lights, preferably a plurality of indicators positioned on various locations on a vehicle, designed to signal a straight ahead direction.

Each indicator light may include a light source holder, a light source and a housing having a base and a lens being connected to one another by at least one fastener. The base has a perimeter wall which surrounds a cavity therein. The cavity holds the light source holder therein and has an aperture allowing wiring from the light source holder to exit the base and be connected to a signaling device.

The signaling device is typically activated by the driver through a switch connected to a turn indicator stem or other device. The switch sends an electrical current from a power source to the light source, thereby allowing the light source to be turned on. The light source may be connected to a flasher unit allowing the light source to emit intermittent light. The signaling device may be deactivated either manually or automatically by a mechanism.

An advantage of the present invention is to prevent automotive accidents and reduce medical and automotive insurance rates by adding an indicator signaling a driver's intention of proceeding in a straight ahead manner. The indicators in the system may be placed in a variety of different locations on the vehicle allowing for high visibility. Preferably, the indicator lights may be viewed from a variety of positions relative to the vehicle, such as from the side of the vehicle or from the front of the vehicle. Further, the visibility of the indicator system is increased by incorporating lens(es) tinted in color or by using a clear lens and green LEDs.

The signaling device of the present invention is capable of being activated by different means such as voice, GPS, hand or foot. These activation means allows human operators to overcome any physical disabilities and still maintain a sense of safety for themselves and surrounding drivers.

The present invention includes at least one vibrating element, such that the element vibrates a steering column, armrest, portion of a seat harness, or other portion of a vehicle in order to provide a distinct feedback to a driver when the straight ahead signal switch is engaged. In one embodiment, the buzzer will vibrate in intervals with a 3 second vibration followed by a 5 second delay.

Further, the present invention allows for solar powered cells to be incorporated either in the housing or onto the lens. These cells allow for the present invention to be operated in an environmental-friendly and cost efficient manner.

Other objects and advantages of the present invention will become apparent from the following descriptions, taken in connection with the accompanying drawings, wherein by way of illustration and example, an embodiment of the present invention is disclosed.

Further advantages of the invention will be more clearly understood from the following description of illustrative embodiments thereof, to be read by way of example and not of limitation in conjunction with the apparatus shown. The beneficial effects described above apply generally to the ball cover disclosed herein. The specific structures through which these benefits are delivered will be described in detail hereinbelow.

BRIEF DESCRIPTION OF THE DRAWINGS

The invention will now be described in greater detail in the following way of example only and with reference to the attached drawings, in which:

FIG. 10 is a front view of an indicator switch mounted on the front edge of a driver's seat.

DETAILED DESCRIPTION OF EMBODIMENT

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention. Although those of ordinary skill in the art may readily recognize many alternative embodiments, especially in light of the illustrations provided herein, this detailed description is exemplary of the preferred embodiment of the present invention, the scope of which is limited only by the claims appended hereto.

Figure 1:
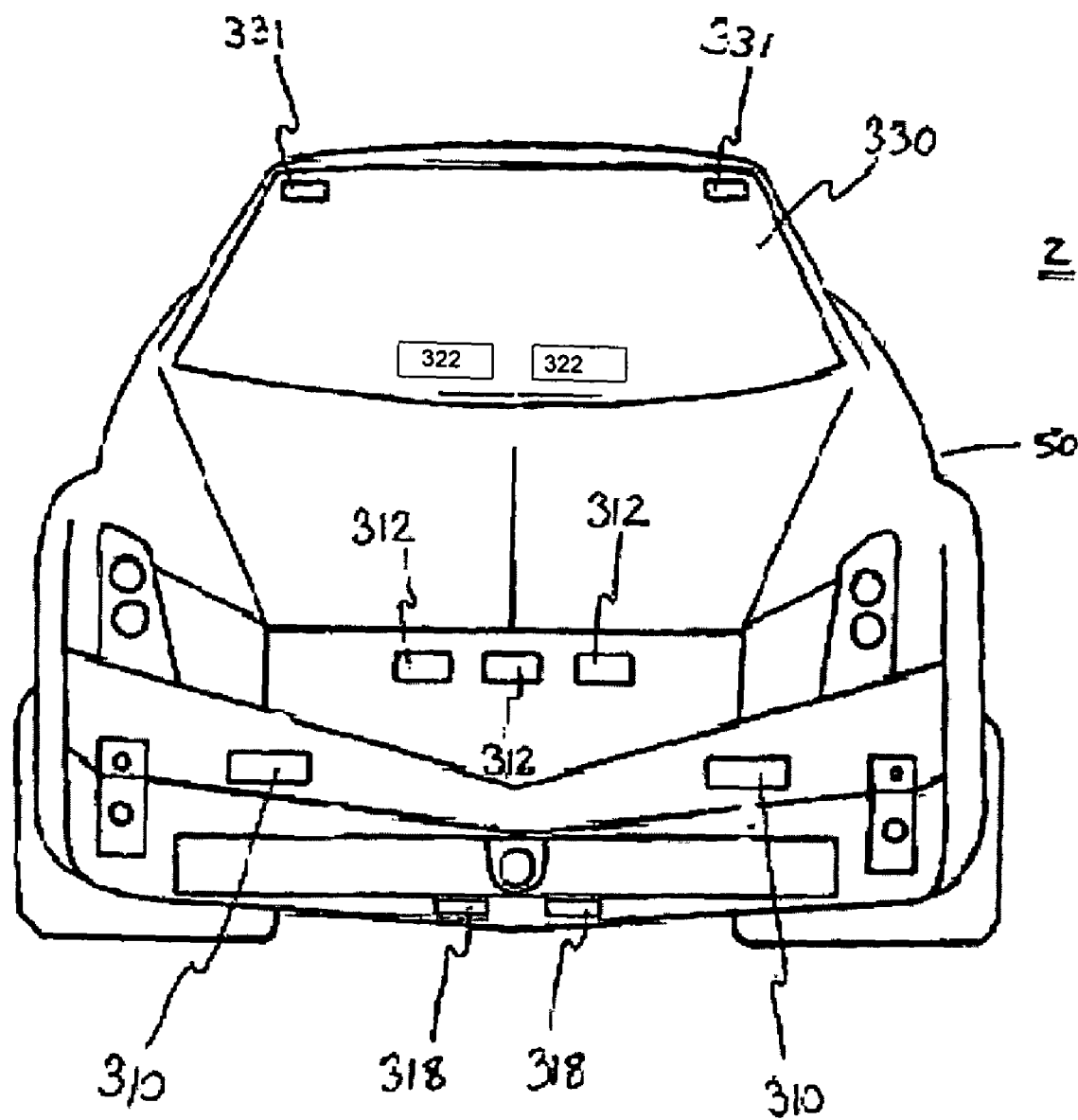
FIG. 1 is a front view of a vehicle 50 illustrating light source locations of windshield corners 331 of the windshield 330, dashboard 322, front grill 312, front bumper 310, and spoiler 318.

FIG. 1 is a front view of a vehicle 50 showing an indicator system 2 which has many potential light source locations including windshield corners 331 of the windshield 330, dashboard 322, front grill 312, front bumper 310, and spoiler 318.

Figure 2:
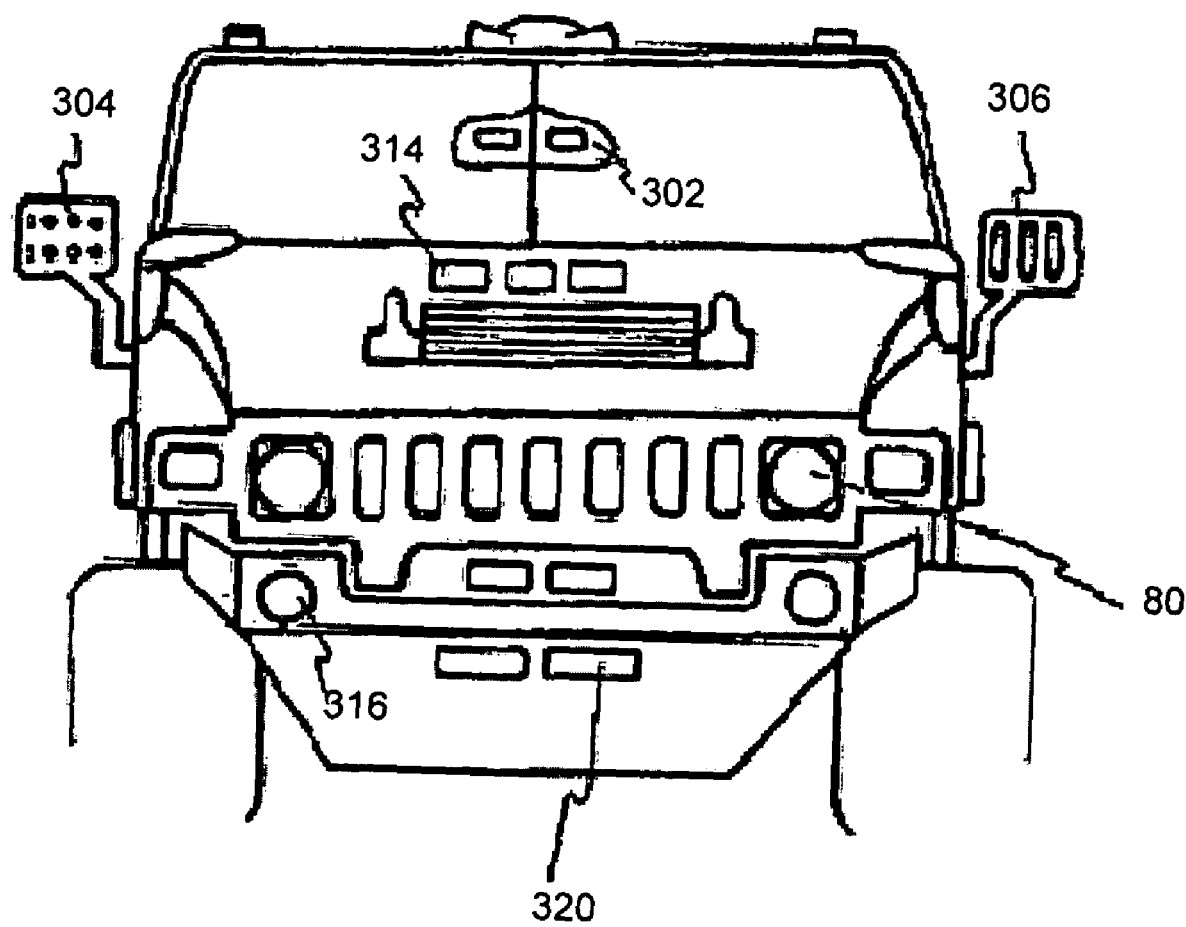
FIG. 2 is a front view of a vehicle 50 illustrating light source locations of the front of the rearview mirror 302, the front of sideview mirrors 304 and 306, hood 314, skid plate 320, and fog lights 316.

FIG. 2 is a front view of a vehicle 50 illustrating potential light source locations of the front of the rearview mirror 302, the front of sideview mirrors 304 and 306, hood 314, skid plate 320, and fog lights 316. The light source locations may also include the side of sideview mirrors or side on side markers.

Figure 3:
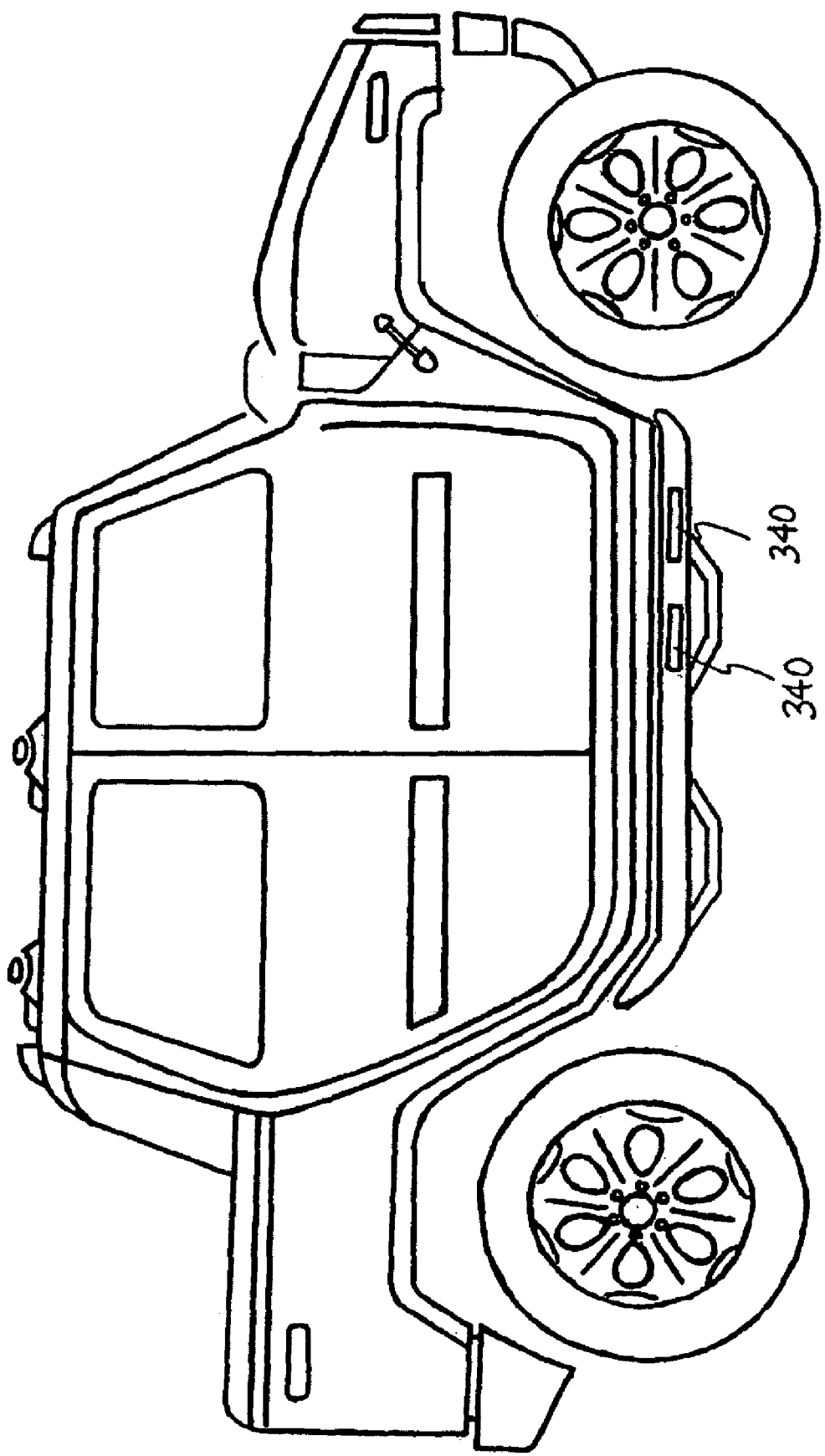
FIG. 3 is a side view of a vehicle 50 illustrating light source locations on the side step up rails 340.

FIG. 3 is a side view of a vehicle 50 illustrating light source locations on the side sep up rails 340.

Figure 4:
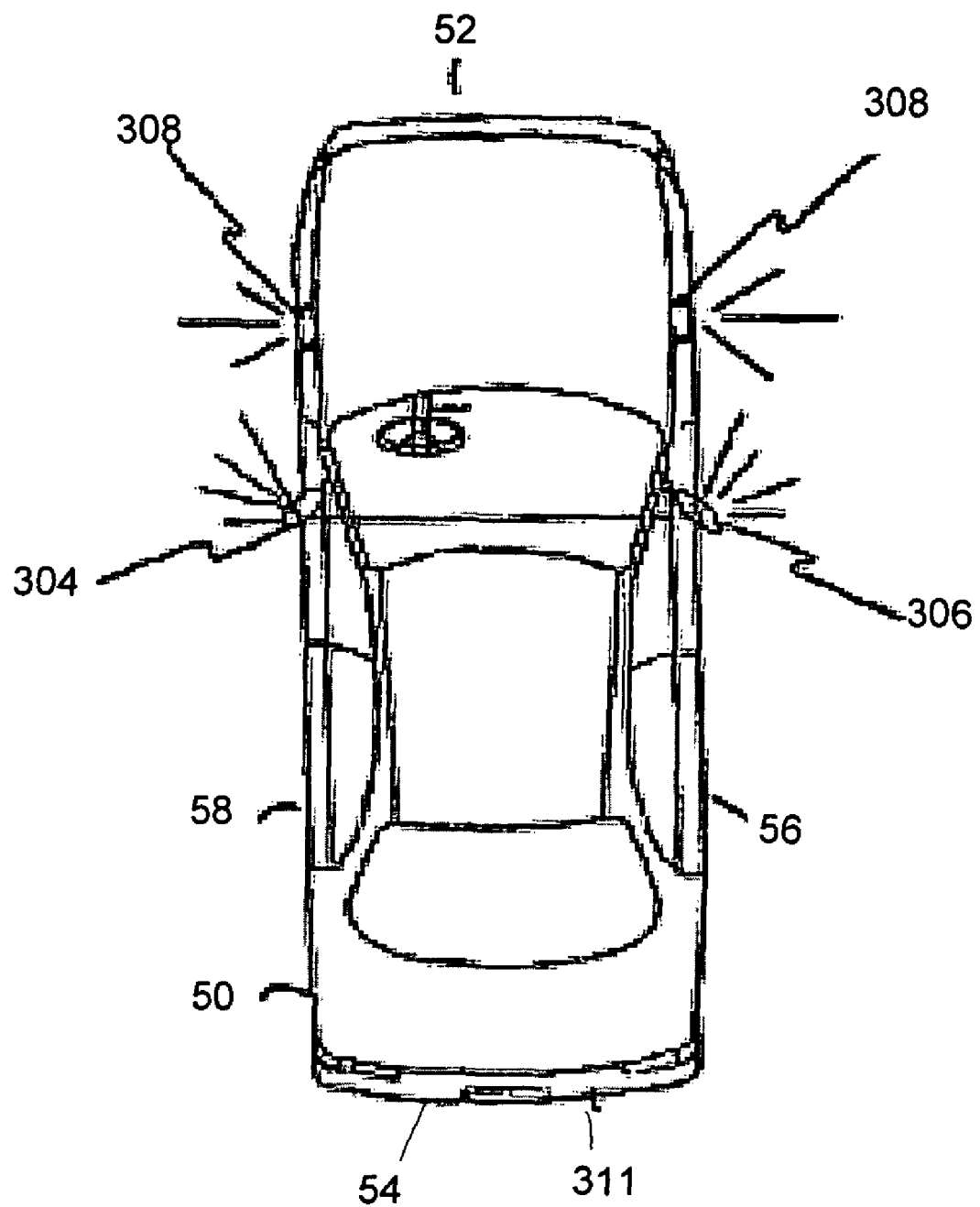
FIG. 4 is a top view of a vehicle 50 illustrating a light source location of a side marker 308, the front of side view mirrors 304 and 306, and the rear bumper 311. The figure also illustrates the front 52, the rear 54, the right side 56, and the left side 58 of the vehicle 50.

FIG. 4 is a top view of a vehicle 50 illustrating a light source location of a side marker 308, the front of side view mirrors 304 and 306, and the rear bumper 311. The figure also illustrates the front 52, the rear 54, the right side 56, and the left side 58 of the vehicle 50.

Figure 5:
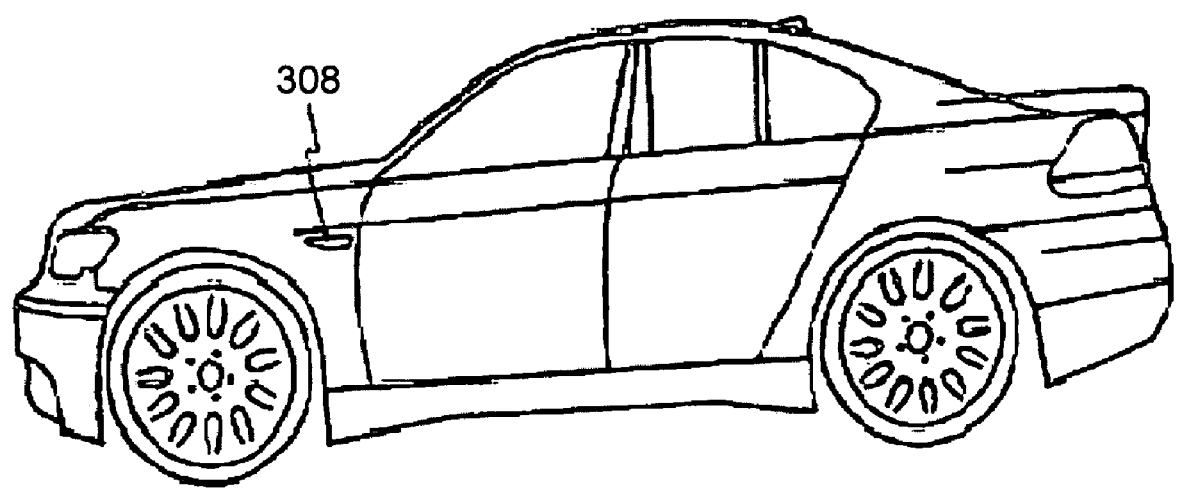
FIG. 5 is a side view of a vehicle illustrating a light source location of a side marker 308.

FIG. 5 is a side view of a vehicle illustrating a light source location of a side marker 308.

FIGS. 1-5 show the indicator system 2 having a plurality of indicators positioned in various locations of the vehicle 50 and designed to signal a straight ahead direction. The locations of the indicator system 2 may include, but are not limited to, a dashboard, windshield, rearview mirror, side view mirrors, front bumper, front grill, hood, roof, spoiler area, fog lights, side markers and the like. Specifically, FIG. 2 depicts the indicator system 2 being built into or mounted onto a front surface of the rear view mirror 302 located within the interior of the vehicle 50. FIG. 2 shows the indicator system built into and mounted onto a front surface of side view mirrors 304 and 306. FIG. 1 illustrates the indicator lights being positioned at corners 331 of a windshield 330. The indicators can be added to the vehicle 50 by the vehicle owner as an after market product, or can be built into the vehicle 50 by a manufacturer.

FIGS. 1-5 shows the vehicle 50 having an additional possible location for the indicator lights including the dashboard 322, the front grill 312, the front bumper 310, the spoiler 318, the hood 314, the skid plate 320, the fog lights 316, the side step up rails 340, the side marker 308, and the rear bumper 311.

Another possible location is to include the indicator system 2 in the front turn signal lights located at the side, front portion of the vehicle 50. In one embodiment, all indicators within the indicator system 2 will flash simultaneously. In this example, a light source 120 of the indicator system 2 would flash on and off as is common with existing turn indicator devices. Obviously, there are other possible locations on the front facing surface of a vehicle that may be acceptable for placing the straight ahead signal indicator of the present invention. In one example, the electrical design of the indicators in all possible locations is such that both straight and turn indicators cannot be activated simultaneously. In one embodiment, some or all of the indicators may have the shape of an arrow which is oriented toward the front of the vehicle. In another embodiment, a plurality of LEDs may be sequenced, such as from rear LED to front LED, to indicate a forward direction. This sequencing would typically be performed simultaneously on both sides of the vehicle.

Figure 6:
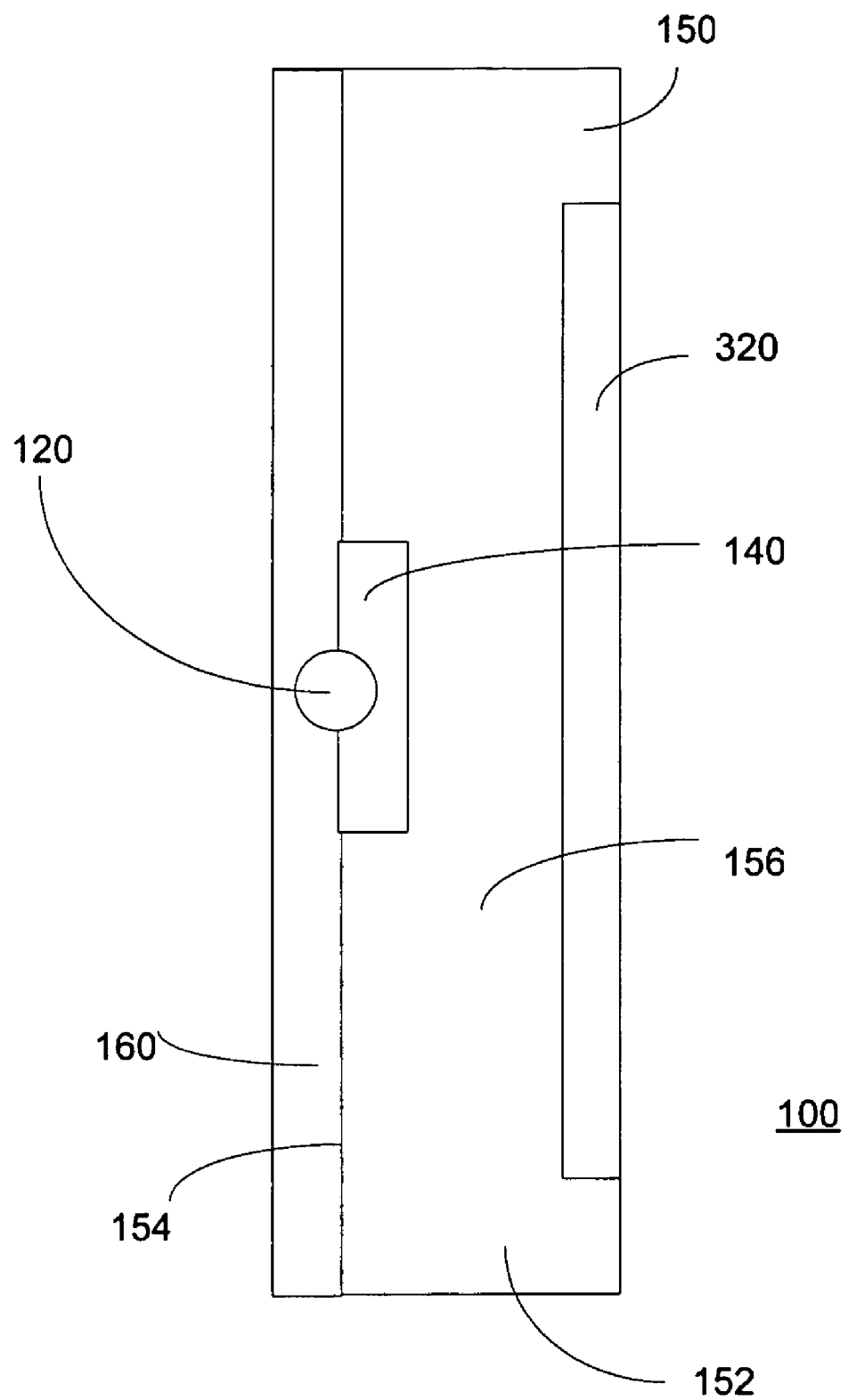
FIG. 6 is a top schematic view of a signal device 100 illustrating a light source 120, a light source holder 140, a housing 150, a housing base 152, a base wall 154, a housing cavity 156, and a lens 160.

FIG. 6 is a top schematic view of a signal device 100 illustrating a light source 120, a light source holder 140, a housing 150, a housing base 152, a base wall 154, a housing cavity 156, and a lens 160. The base 152 has a perimeter wall 154 which surrounds a cavity 156 therein. The cavity is adapted to accept the light source holder 140 therein and an aperture allowing wiring from the light source holder to exit the base and be connected to the electrical system of the vehicle 50. Specifically, the light source holder 140 is fixedly positioned within the cavity of the base and is electrically connected to a signaling device 100. The light source is removably mounted in the light source holder.

Figure 7:
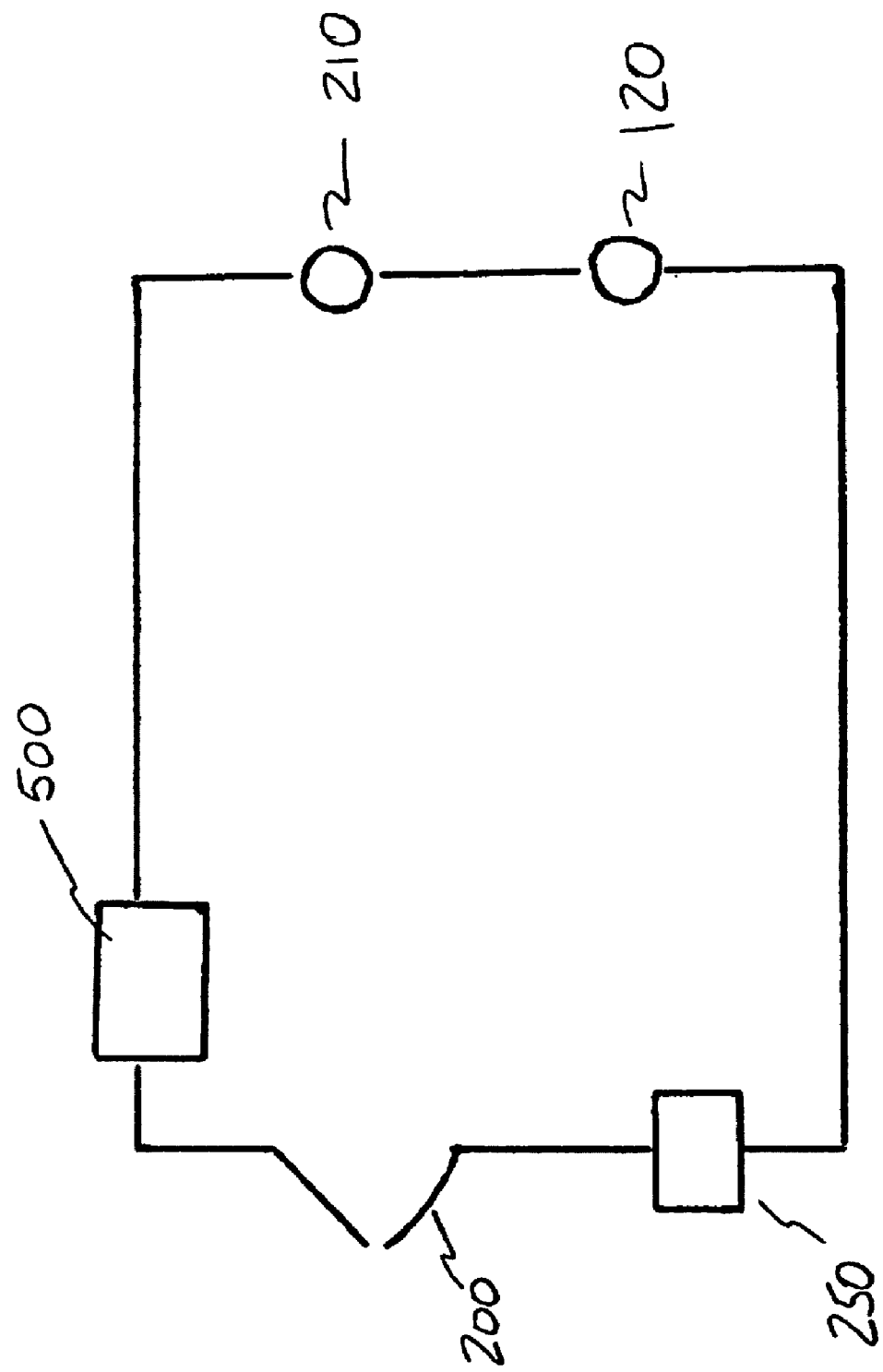
FIG. 7 is a schematic of a control circuit for a light source including a switch 200, a flasher unit 210, a battery power source 250, and a cutoff sensor 500.

FIG. 7 is a schematic of a control circuit for a light source including a switch 200, a flasher unit 210, a battery power source 250, and a cutoff sensor 500. The signaling device 100 is activated by the vehicle driver through a switch 200 connected to a turn indicator stem or other device. The switch 200 may be activated by, but not limited to, a hand operated switch, a foot operated switch, a voice activated mechanism and/or a global positioning system (hereinafter called GPS system or GPS receiver). Operatively speaking, when the switch 200 is activated, it sends electrical current to the light source 120, thereby allowing the light source 120 to be turned on. The light source 120 may be connected to a flasher unit 210 thereby allowing the light source to emit intermittent light designed to flash for a determined period of time, such as ten seconds. The light source 120 is removably connected to the light source holder 140 and may come in the form of light emitting diodes, solar powered cells, lasers, reflectors, light bulbs, incandescent bulbs, battery operated lights, electric lights and the like. In turn, the signaling device 100 may be deactivated either manually at the discretion of the driver (such as by hand or foot), by voice or automatically by a mechanism such as a cutoff sensor 500, including but not limited to, GPS system recognizing the position change of the vehicle 50, accelerometer detecting the speed change of the vehicle 50 and the like.

In this example, the lens 160 is mounted onto a perimeter wall 154 of the base 152 and may be transparent, but is preferably tinted. In a preferred embodiment, the lens is tinted having the color green deemed as its universal sign for proceeding in a straight ahead manner. In the alternative, the lens of the housing 150 may include solar powered cells, namely photovoltaic cells, therein designed to act as the light source during the daytime hours. The photovoltaic cells maintain its basic structures generally including an anti-reflective coating, a contact grid, N-type silicone, P-type silicone and a back contact. A durable, non-glass cover plate is preferably placed on the anti-reflective coating in order to protect the solar-powered cells from being exposed to the elements. The light source or lens may have a unique shape such as a directional arrow, so that other drivers can more easily distinguish the signal.

In this embodiment, the photovoltaic cells convert the sunlight into electricity by absorbing the light and transferring the energy of the absorbed light to a semiconductor, whereby the energy frees electron-hole pairs. The photovoltaic cells include at least one electric field, thereby forcing freed electrons to migrate in a specified direction. Metal contacts are placed on polar opposite sides of the photovoltaic cells, thereby drawing current away to external use. When nighttime falls, the solar powered lens will cease and will rely on the light source 120 contained within the housing 150 as then means for illumination for the indicator system 2.

Vibrating Signal Indicator

Figure 8:
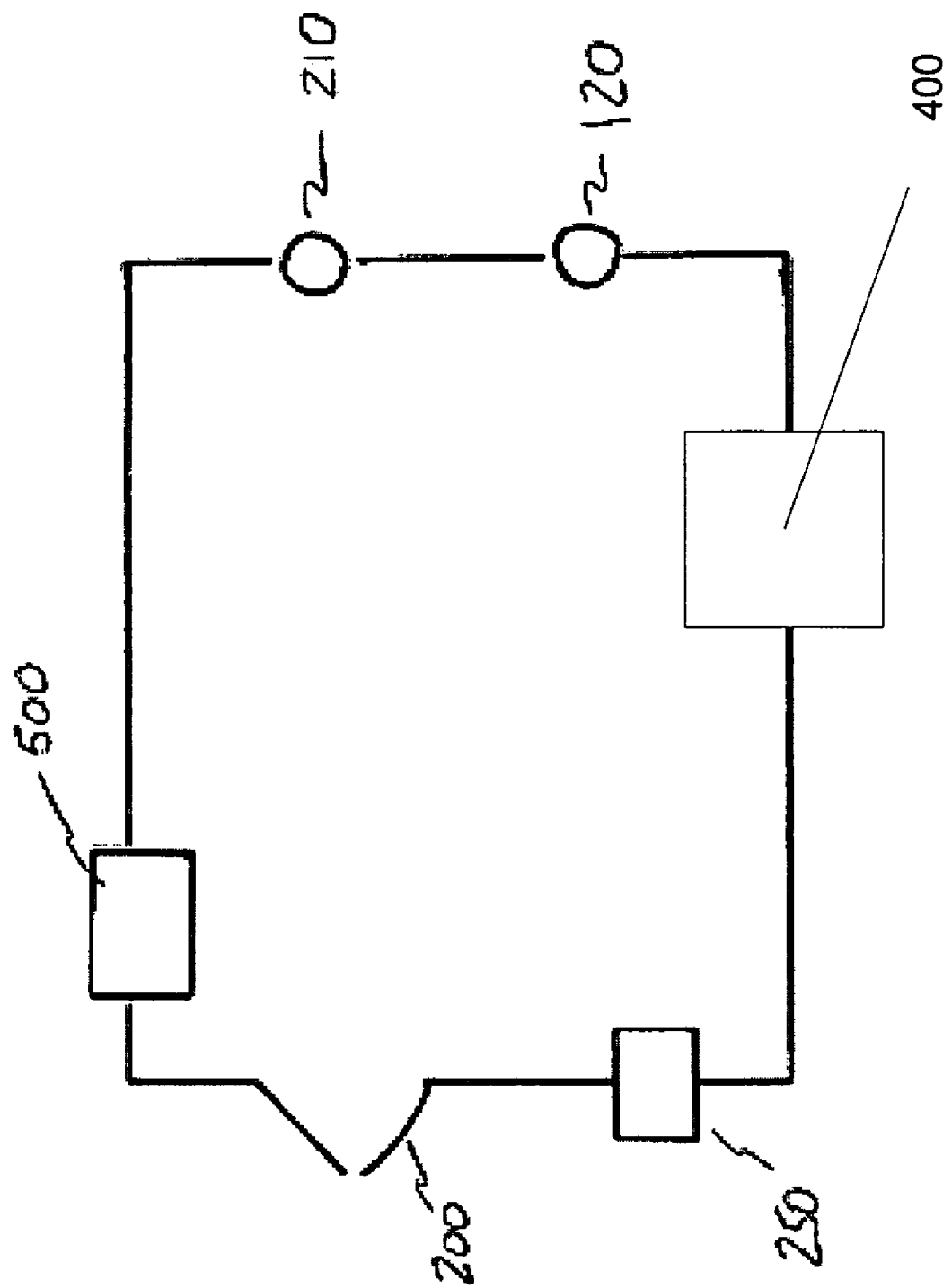
FIG. 8 is a schematic of a control circuit for a light source including a switch 200, a flasher unit 210, a battery power source 250, a cutoff sensor 500, and a vibration element.

FIG. 8 is a schematic of a control circuit for a light source including a switch 200, a flasher unit 210, a battery power source 250, a cutoff sensor 500, and a vibration element. In one example, the vibration element is positioned in the steering wheel or steering column of a vehicle so that the driver's hands will sense when the signal is on.

In another example, the vibration element is positioned in a vehicle armrest or seat so that the driver's arm, seat, or torso will sense when the signal is on.

In one example, the vibrating signal indicator is similar to the "force feedback" vibration elements in video game flight simulators. In another example, the vibrating signal indicator is similar to the vibrating devices in cell phones, which are typically an electric motor with an off-center weight.

In one example, the vibrating signal indicator will vibrate in a cycle of five seconds of vibration followed by three seconds of non-vibration.

Example

Figure 9:
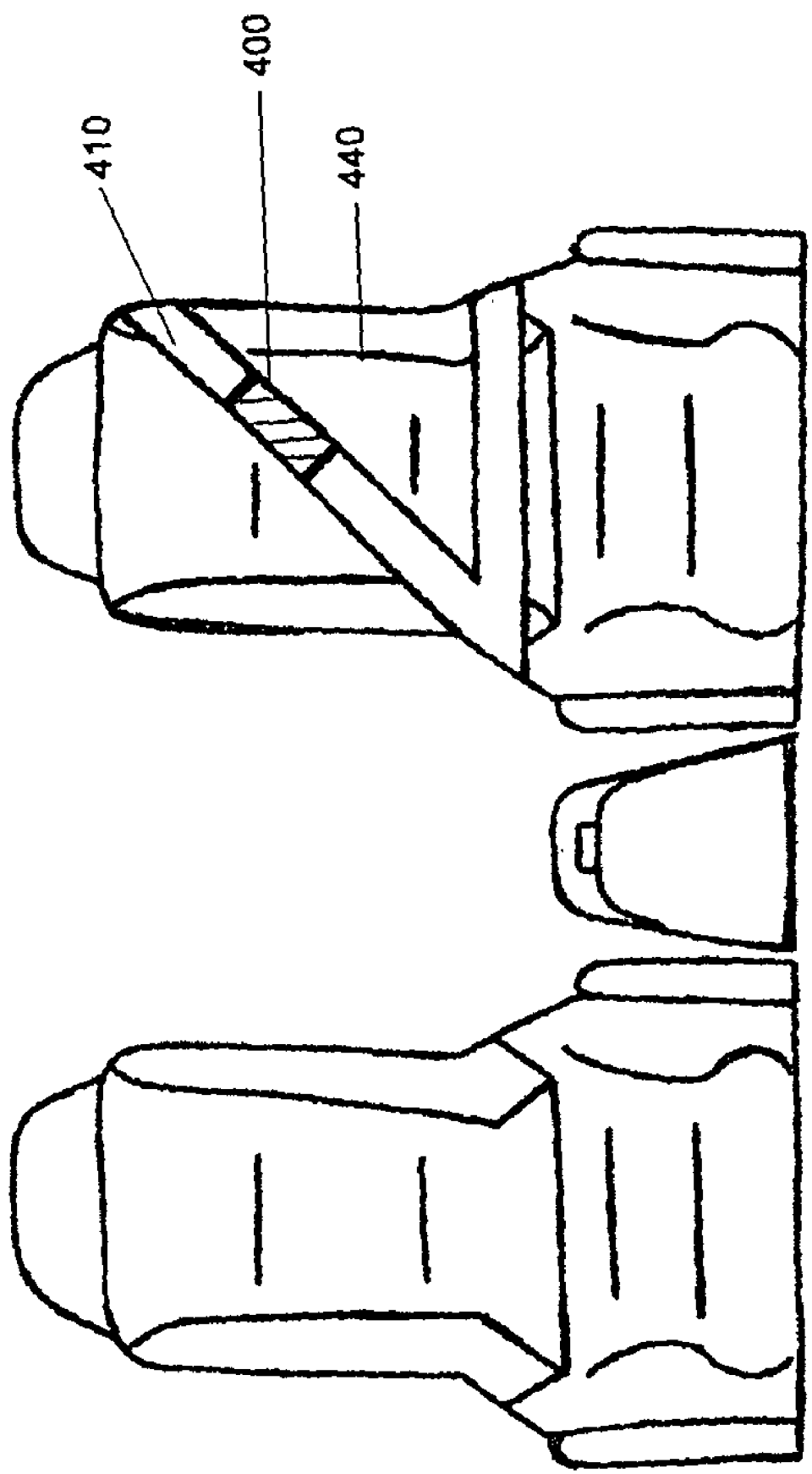
FIG. 9 is a front view of a seat harness with a buzzing pad.

FIG. 9 is a front view of a seat harness with a buzzing pad 400. In this example, a buzzing vibration element is mounted on a portion of a seat belt or seat harness 410. One method of mounting the device is to place the device in a pocket of form fitting material and to removably attach the material to the seat harness with a hoop and loop fastening material. FIG. 10 is a front view of an indicator switch 430 mounted on the front edge of a driver's seat 440. The switch may be a wired to the indicator lights and the buzzing pad, or may communicate wirelessly with the lights and indicator. A wired connection may be established by running wires through a console adjacent to the seat and then through a lower portion of the front of the seat. This type of connection may be provided on an after-market indicator device for existing vehicles or on a new vehicle. In this example, two indicator lights are provided, with one light mounted on each of the side view mirrors of the vehicle.

As the above description and illustrations show, the straight ahead signal indicator of the present invention can be placed in a variety of locations and can help drivers communicate with each other at an intersection to help tell other drivers that it is the intention of the vehicle to proceed in a straight direction.

While the invention has been described in connection with a preferred embodiment, it is not intended to limit the scope of the invention to the particular form set forth; however, it is intended to cover such alternatives, modifications, and equivalents as may be included within the spirit and scope of the invention as defined by the appended claims.

INDUSTRIAL APPLICABILITY

The present invention finds specific industrial applicability in the automobile industry.

What is claimed is:

1. A forward direction indicator system for a vehicle, the system comprising
   a vehicle having a front, a first side, a second side, and a rear;
   a first straight ahead indicator light, mounted in proximity to the first side of the vehicle, between the front and rear of the vehicle, such that the first indicator light may be observed from the first side of the vehicle;
   a second straight ahead indicator light, mounted in proximity to the second side of the vehicle, between the front and rear of the vehicle, such that the second indicator light may be observed from the second side of the vehicle;
   a power supply;
   a switch which may be engaged to provide power from the power supply to the first indicator light and to the second indicator light, such that when the switch is engaged, the first indicator light will flash intermittently, and the second indicator light will flash intermittently, such that the switch may be engaged to indicate that the vehicle will move in a forward direction; and
   at least one vibration element, such that the vibration element is activated while the switch is engaged.

2. The system of claim 1 wherein the first indicator light comprises a housing and a single light source.

3. The system of claim 1 wherein the first indicator light comprises a housing and a plurality of light sources.

4. The system of claim 3 wherein the plurality of light sources are arranged in the shape of an arrow.

5. The system of claim 1 further comprising
   a third indicator light may be observed from the front of the vehicle.

6. The system of claim 5 wherein the first indicator light is positioned at a point selected from the group consisting of a roof, a spoiler, a front bumper, a fog light, a grill, a hood, a dashboard, a corner portion of the front windshield, and the front of a side view mirror.

7. The system of claim 5 wherein the second indicator light is positioned at a point selected from the group consisting of a spoiler, a front bumper, a grill, a hood, a dashboard, a corner portion of the front windshield, and the front of a side view mirror, the side of a side view mirror, a side step up rail, and a side marker.

8. The system of claim 5 further comprising
   a fourth indicator light may be observed from the rear of the vehicle.

9. The system of claim 5 wherein the third indicator light may be observed from the front of the vehicle and from the second side of the vehicle.

10. The system of claim 1 further comprising a third straight ahead indicator light, such that when the switch is engaged, the third indicator light will flash intermittently.

11. The system of claim 1 wherein
    the first indicator light further comprises a green lens; and
    the second indicator light further comprises a green lens.

12. The system of claim 1 wherein the switch is mounted in proximity to a turn signal switch of the vehicle.

13. The system of claim 1 wherein
    the vehicle further comprises a turn signal;
    the first indicator light cannot be activated when the turn signal is activated; and
    the turn signal cannot be activated when the first indicator light is activated.

14. The system of claim 1 wherein the first indicator light and the second indicator light flash simultaneously when activated.

15. The system of claim 1 wherein the first indicator light is selected from the group consisting of light emitting diodes, solar powered cells, lasers, reflectors, light bulbs, incandescent bulbs, battery operated lights and electric lights.

16. The system of claim 1 wherein the first indicator light further comprises
    a housing, including a base, a cavity, and a light source holder;
    a lens; and
    a light source removably mounted in the light source holder.

17. The system of claim 1 wherein the switch is selected from the group comprising a hand operated switch, a foot operated switch, a voice activated mechanism and a global positioning system.

18. The system of claim 1 wherein
    the vibration element is positioned on a seat harness.

19. A method of indicating that a vehicle will continue to move in a forward direction, the vehicle having a front, a first side, a second side, and a rear, the method comprising
    placing a first straight ahead indicator light on the vehicle at a first position in proximity to the first side of the vehicle, between the front and rear of the vehicle, such that the first indicator light may be observed from the first side of the vehicle;
    placing a second straight ahead indicator light on the vehicle at a second position in proximity to the second side of the vehicle, between the front and rear of the vehicle, such that the second indicator light may be observed from the second side of the vehicle;
    providing a power supply;
    providing a switch which may be engaged to provide power from the power supply to the first indicator light and the second indicator light, such that when the switch is engaged, the first indicator light will flash intermittently, and the second indicator light will flash intermittently;
    engaging the switch to indicate an intention to continue moving forward; and
    providing at least one vibration signal while the switch is engaged.

20. The method of claim 19 further comprising
    placing the first indicator light on the vehicle at a position selected from the group consisting of a roof, a spoiler, a front bumper, a fog light, a grill, a hood, a dashboard, a corner portion of the front windshield, and the front of a side view mirror; and
    placing the second indicator light on the vehicle at a position selected from the group consisting of a spoiler, a front bumper, a grill, a hood, a dashboard, a corner portion of the front windshield, the side of a side view mirror, and the front of a side view mirror, a side step up rail, and a side marker.

* * * * *